United States Patent
Hara et al.

(10) Patent No.: US 11,772,472 B2
(45) Date of Patent: Oct. 3, 2023

(54) VEHICLE BATTERY PROTECTION STRUCTURE

(71) Applicant: SUBARU CORPORATION, Tokyo (JP)

(72) Inventors: Toshiyuki Hara, Tokyo (JP); Yutaka Yokoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 612 days.

(21) Appl. No.: 16/942,949

(22) Filed: Jul. 30, 2020

(65) Prior Publication Data

US 2021/0094401 A1 Apr. 1, 2021

(30) Foreign Application Priority Data

Sep. 27, 2019 (JP) .................................. 2019-177497

(51) Int. Cl.
*B60K 1/04* (2019.01)
*B60H 1/00* (2006.01)
(Continued)

(52) U.S. Cl.
CPC ........... *B60K 1/04* (2013.01); *B60H 1/00564* (2013.01); *B60L 50/66* (2019.02); *B60L 58/26* (2019.02); *B62D 21/03* (2013.01); *B62D 25/2036* (2013.01); *H01M 10/613* (2015.04); *H01M 10/625* (2015.04); *H01M 10/6556* (2015.04); *H01M 50/20* (2021.01); *B60K 6/28* (2013.01); *B60K 2001/0422* (2013.01); *B60K 2001/0433* (2013.01); *B60Y 2200/91* (2013.01);

(Continued)

(58) Field of Classification Search
CPC ....... B60K 1/04; B60H 1/00564; B60L 58/26; B62D 21/03; B62D 25/2036; B62D 21/157
USPC ...................... 296/209, 208, 193.07, 187.12
See application file for complete search history.

(56) References Cited

U.S. PATENT DOCUMENTS

| 9,259,998 B1 | 2/2016 | Leanza et al. |
| 10,752,079 B2 * | 8/2020 | Takezawa ........... H01M 10/625 |
| 2017/0267059 A1 | 9/2017 | Koyama et al. |

FOREIGN PATENT DOCUMENTS

| DE | 102015213860 A1 | 1/2017 |
| JP | 2002-186101 A | 6/2002 |

(Continued)

OTHER PUBLICATIONS

Japanese Office Action dated Apr. 25, 2023 in Japanese Patent Application No. 2019-177497 (2 pages in Japanese with English translation).

*Primary Examiner* — Dennis H Pedder
(74) *Attorney, Agent, or Firm* — Smith, Gambrell & Russell, LLP (57) ABSTRACT

A vehicle battery protection structure includes a vehicle frame member, a first duct, and a second duct. The vehicle frame member is disposed in a region including a battery. The vehicle frame member has a through hole. The battery is mountable on a vehicle. The first duct is disposed on an outside of the battery at a location oriented toward an outside of the vehicle. The second duct is inserted through the through hole of the vehicle frame member. The second duct is disposed to overlap the first duct in a vertical direction of the first duct on the outside of the battery at the location oriented toward the outside of the vehicle.

19 Claims, 4 Drawing Sheets

(51) Int. Cl.
  *B60L 50/60* (2019.01)
  *B62D 25/20* (2006.01)
  *B62D 21/03* (2006.01)
  *H01M 10/613* (2014.01)
  *H01M 10/6556* (2014.01)
  *H01M 10/625* (2014.01)
  *B60L 58/26* (2019.01)
  *H01M 50/20* (2021.01)
  B60K 6/28 (2007.10)
  B62D 21/15 (2006.01)

(52) U.S. Cl.
  CPC ......... *B60Y 2200/92* (2013.01); *B62D 21/157* (2013.01); *H01M 2220/20* (2013.01)

(56) References Cited

FOREIGN PATENT DOCUMENTS

| | | | |
|---|---|---|---|
| JP | 2009-35094 A | | 2/2009 |
| JP | 2015-074406 A | | 4/2015 |
| JP | 2017-165305 A | | 9/2017 |
| JP | 6406275 B2 | * | 10/2018 |
| JP | 2018-193026 A | | 12/2018 |
| KR | 101355584 B1 | * | 1/2014 |

* cited by examiner

VEHICLE BATTERY PROTECTION STRUCTURE

CROSS-REFERENCE TO RELATED APPLICATIONS

The present application claims priority from Japanese Patent Application No. 7019-177497 filed on Sep. 27, 2019, the entire contents of which are hereby incorporated by reference.

BACKGROUND

The technology relates to a vehicle battery protection structure.

A vehicle, such as a hybrid electric vehicle or an electric vehicle, is mounted with a rechargeable battery used to supply electric power to an electric motor for traveling. The rechargeable battery generally has relatively large capacity, and is configured as a battery module including a plurality of unit batteries in combination. Each unit battery is called a battery cell. In a case of a collision accident, for example, strong impact is applied to the rechargeable battery. This can cause leakage of current from the battery or generation of gas from the battery. Therefore, measures are to be taken to achieve cushioning for the rechargeable battery. Japanese Unexamined Patent Application Publication (JP-A) No. 2009-035094 discloses an energy absorption structure of a battery mounting part. The energy absorption structure protects a battery via an impact absorption duct. The impact absorption duct couples a body floor and a center console box to each other. In response to application of a load upon lateral collision, the impact absorption duct is deformed to absorb kinetic energy of the center console box.

SUMMARY

An aspect of the technology provides a vehicle battery protection structure including a vehicle frame member, a first duct, and a second duct. The vehicle frame member is disposed in a region including a battery. The vehicle frame member has a through hole. The battery is mountable on a vehicle. The first duct is disposed on an outside of the battery at a location oriented toward an outside of the vehicle. The second duct is inserted through the through hole of the vehicle frame member. The second duct is disposed to overlap the first duct in a vertical direction of the first duct on the outside of the battery at the location oriented toward the outside of the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1:
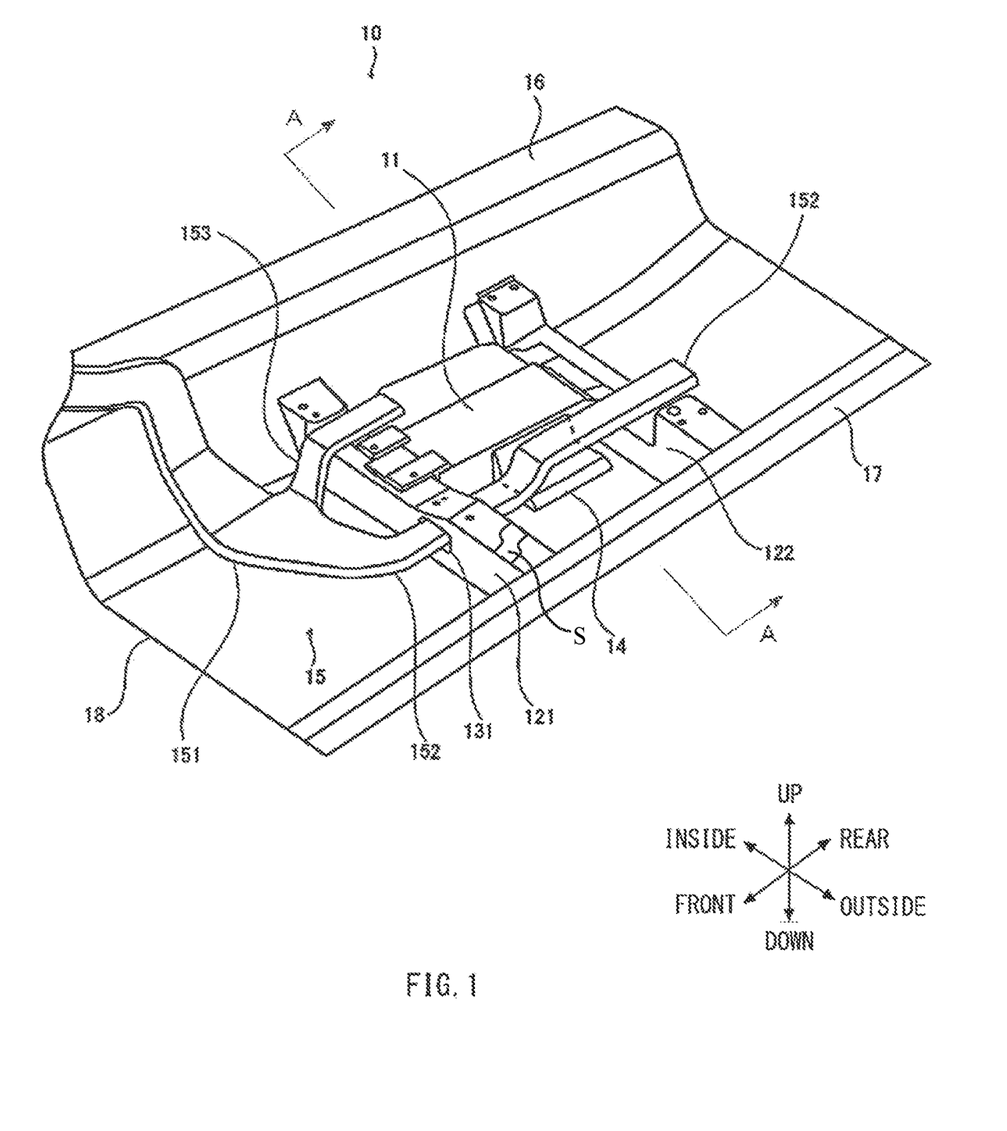
FIG. 1 is a perspective view of an overall configuration of a vehicle battery protection structure according to one example embodiment of the technology.

FIG. 1 is a perspective view of an overall configuration of a vehicle battery protection structure (hereinafter also referred to as "battery protection structure") 10 according to an example embodiment of the technology. The battery protection structure 10 according to the example embodiment may be mounted on a vehicle such as an automobile, FIG. 1 illustrates a front outside portion of a body floor 18 of the vehicle.

The battery protection structure 10 according to the example embodiment may be configured to absorb impact energy when another vehicle or an obstacle collides with the vehicle (own vehicle) from the outside of the vehicle. The battery protection structure 10 may thereby protect a battery 11 from collision. The example embodiment may assume, as collision, lateral collision with the vehicle (hereinafter referred to as "side collision").

In one example, the battery protection structure 10 may include a pair of cross-members 121 and 122, a first air-conditioning duct branch 152 of an air-conditioning duct 15, and a battery duct 14. The cross-members 121 and 122 may be disposed in the vicinity of the battery 11. The cross-members 121 and 122 may extend parallel to the vehicle width direction. The cross-members 121 and 122 may be included in a body frame structure (body frame) of the vehicle, and may be disposed parallel to each other to be apart from each other in a longitudinal direction of the vehicle. The cross-member 121 may have a first through hole 131 penetrating the cross-member 121 in the longitudinal direction of the vehicle. The first air-conditioning duct branch 152 may be inserted through the first through hole 131 to extend in the longitudinal direction of the vehicle between the cross-members 121 and 122. The first air-conditioning duct branch 152 may, between the cross-members 121 and 122, extend on the outside of the battery 11 at a location oriented toward the outside of the vehicle, and overlap the battery duct 14 in a vertical direction. The battery duct 14 will be described later.

In one embodiment, the cross-members 121 and 122 may serve as a "vehicle frame member", the battery duct 14 may serve as a "first duct", and the first air-conditioning duct branch 152 may serve as a "second duct". In one embodiment, of the cross-members 121 and 122, the cross-member 121 disposed on the front side may serve as a "first vehicle frame member", and the cross-member 122 disposed on the rear side may serve as a "second vehicle frame member".

The battery 11 may store electric power to be supplied to a traveling motor and electrical components of the vehicle that is an electric-powered vehicle. Examples of the vehicle applicable to the example embodiment may include an electric vehicle (EV), a hybrid electric vehicle (HEV) and a plug-in hybrid electric vehicle (MEV).

The battery 11 may include a plurality of battery stacks, and each of the battery stacks may include a plurality of battery cells stacked on each other. The battery 11 may be, for example, a secondary battery such as a lithium ion battery or a nickel-metal hydride battery.

The body floor 18 may have a floor tunnel 16 and a side sill 17 that are included in the body frame structure. The floor tunnel 16 may be provided along the longitudinal direction of the vehicle in a central portion of the body floor 18 in the vehicle width direction. The floor tunnel 16 may be raised upward. The side sill 17 may be provided along the longitudinal direction of the vehicle at an end of the body floor 18. The end of the body floor 18 may be disposed at the location oriented toward the outside of the vehicle. The side sill 17 may have a columnar shape. The battery 11 may be disposed between the floor tunnel 16 and the side sill 17 in the vehicle width direction.

The cross-member 121 and the cross-member 122 may be disposed as vehicle frame members on the body floor 18. The cross-member 121 may be disposed in front of the battery 11 and the cross-member 122 may be disposed in the rear of the battery 11. An end of the cross-member 121 disposed at the location oriented toward the outside of the vehicle may be rigidly coupled to the side sill 17, and an end of the cross-member 121 disposed at a location oriented toward the inside of the vehicle may be rigidly coupled to the floor tunnel 16. An end of the cross-member 122 disposed at the location oriented toward the outside of the vehicle may be rigidly coupled to the side sill 17, and an end of the cross-member 122 disposed at the location oriented toward the inside of the vehicle may be rigidly coupled to the floor tunnel 16.

The cross-member 121 may have the first through hole 131. The first through hole 13*l* may penetrate the cross-member 121 in the longitudinal direction of the vehicle. The first through hole 131 may be provided at a location oriented more toward the outside of the vehicle than an end of the battery 11 disposed at the location oriented toward the outside of the vehicle. The first through hole 131 may have a size and a shape that allow the first air-conditioning duct branch 152 to be inserted therethrough.

A seat S, schematically illustrated in FIG. 1 may be fixed to a top surface of the cross-member 121. Such a configuration enables, while using the cross-member 121 to support the seat, the cross-member 121 (e.g., an inner surface of the first through hole 131) to support the first air-conditioning duct branch 152 without inhibiting routing of the first air-conditioning duct branch 152. This makes it possible to improve impact resistance of the first air-conditioning duct branch 152.

The battery duct 14 may be provided on the outside of the battery 11 at the location oriented toward the outside of the vehicle. The battery duct 14 may be provided to cool the battery 11. In the example embodiment, the battery duct 14 may exhaust, to the exterior, heat generated in charging and discharging of the battery 11. The battery duct 14 may include, for example, a synthetic resin such as polypropylene (PP).

An air-conditioning duct 15 may be provided for air-conditioning of a cabin. In the example embodiment, air-conditioning air may flow through the air-conditioning duct 15. The air-conditioning duct 15 may include, for example, a synthetic resin such as polypropylene (PP). In one example, the air-conditioning duct 15 may have an air-conditioning duct gathering part 151, the first air-conditioning duct branch 152, and a second air-conditioning duct branch 153. The air-conditioning duct gathering part 151 may be provided upstream in terms of flow of the air-conditioning air. The first air-conditioning duct branch 152 and the second air-conditioning duct branch 153 may be provided downstream of the air-conditioning duct gathering part 151 to branch from the air-conditioning duct gathering part 151.

An upstream-side end of the air-conditioning duct gathering part 151 may be coupled to a vehicle air-conditioning device. A downstream-side end of the air-conditioning duct gathering part 151 may be coupled to the first and second air-conditioning duct branches 152 and 153, as described above.

An upstream-side end of the first air-conditioning duct branch 152 may be coupled to the air-conditioning duct gathering part 151, and a downstream-side end of the first air-conditioning duct branch 152 may open to the cabin (not illustrated). A middle portion of the first air-conditioning duct branch 152 may penetrate the first through hole 131 of the cross-member 121, and pass above the cross-member 122. The first air-conditioning duct branch 152 may be disposed, between the cross-member 121 and the cross-member 122, on the outside of the battery 11 at the location oriented toward the outside of the vehicle. The first air-conditioning duct branch 152 may have a bend that is bent upward to be diverted around the battery duct 14.

An upstream-side end of the second air-conditioning duct branch 153 may be coupled to the air-conditioning duct gathering part 151, and a downstream-side end of the second air-conditioning duct branch 153 may open to the cabin (not illustrated). A middle portion of the second air-conditioning duct branch 153 branching from the air-conditioning duct gathering part 151 may be bent upward to pass above the cross-member 121 and the battery 11.

In the example embodiment, on the outside of the battery 11 at the location oriented toward the outside of the vehicle, the battery duct 14 and the air-conditioning duct 15 (the first air-conditioning duct branch 152) overlap each other in the vertical direction, as described above. Such arrangement makes it possible to mitigate, upon side collision, impact applied to the battery 11.

In one example, in front of and the rear of the battery 11, the cross-member 121 and the cross-member 122 may respectively be disposed along the vehicle width direction. On the outside of the battery 11 at the location oriented toward the outside of the vehicle, the side sill 17 may be provided along the longitudinal direction of the vehicle. In a case where side collision occurs, e.g., pole collision with a side surface of the vehicle (pole lateral collision) occurs, the side sill 17 can be bowed locally toward the inside of the vehicle. This can apply strong impact to the battery 11.

In the example embodiment, the battery duct 14 and the air-conditioning duct 15 (the first air-conditioning duct branch 152) are disposed on die outside of the battery 11 at the location oriented toward the outside of the vehicle. The battery duct 14 and the air-conditioning duct 15 overlap each other as seen from above. Both including a synthetic resin, the battery duct 14 and the air-conditioning duct 15 may have some mechanical strength while being deformable. This enables, in a case where side collision occurs, the battery duct 14 and the air-conditioning duct 15 to be deformed at the same time in response to strong impact, while exerting moderate mechanical strength. This makes it possible to absorb impact, thereby mitigating impact to the battery 11. The battery duct 14 and the air-conditioning duct 1 may be provided for intrinsic purposes of the vehicle, i.e., cooling of the battery H and air-conditioning of the cabin, not being dedicated for impact avoidance. This makes it less likely for cost to increase.

Figure 2:
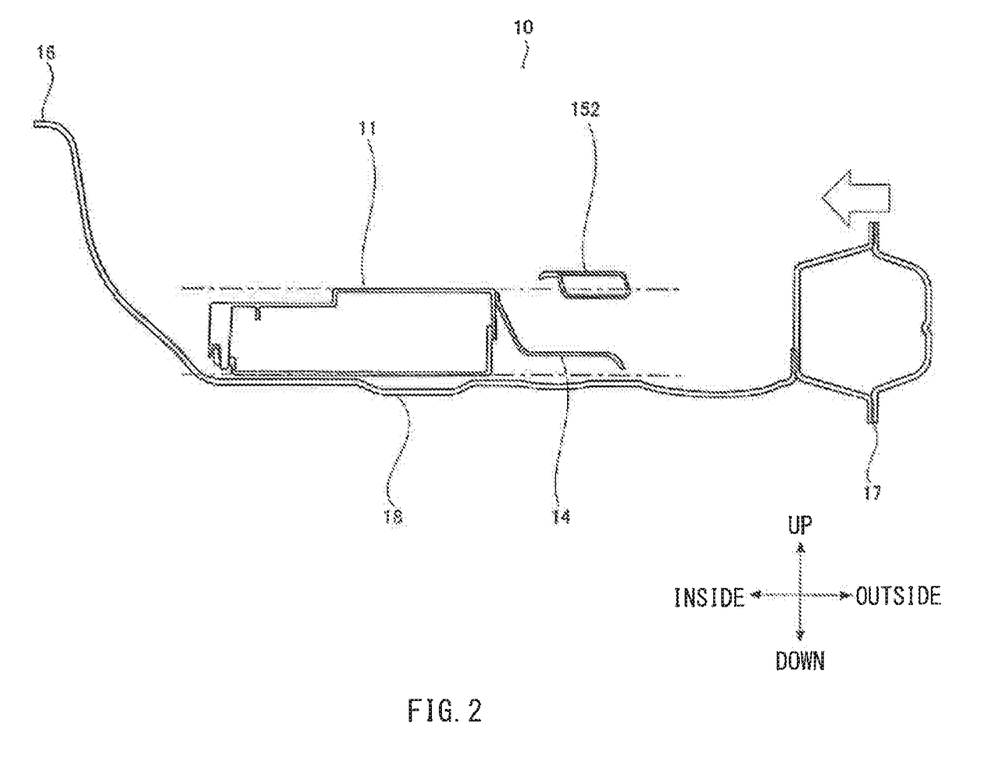
FIG. 2 is a schematic cross-sectional view of a normal state of the battery protection structure according to the example embodiment.

FIG. 2 is a cross-sectional view taken along line A-A in FIG. 1, and schematically illustrates a normal state of the battery protection structure 10 according to the example embodiment. Dot-and-dash lines in FIG. 2 indicate positions at the same heights as an upper end (top surface) and a lower end (bottom surface) of the battery 11.

As illustrated in FIG. 2, the battery 11 may be disposed, between the floor tunnel 16 and the side sill 17, on a top surface of the body floor 18. The battery 11 may be positioned at a height substantially equal to that of the side sill 17. The battery duct 14 and the air-conditioning duct 15 (the first air-conditioning duct branch 152) may be disposed on the outside of the battery H at the location oriented toward the outside of the vehicle. The battery duct 14 and the air-conditioning duct 15 may overlap each other vertically. The battery duct 14 and the air-conditioning duct 15 may overlap each other partially, or entirely over the whole width of the first air-conditioning duct branch 152.

In the example embodiment, the battery duct 14 and the air-conditioning duct 15 (the first air-conditioning duct branch 152) nay be disposed, between the battery 11 and the side sill 17, close to the battery 11. Such arrangement makes it possible to, in a case where side collision occurs, cause deformation of the battery duct 14 and the air-conditioning duct 15 in the vicinity of the battery 11, making it possible to effectively absorb and mitigate impact due to the side collision.

A lower end of the battery duct 14 may be disposed above the bottom surface of the battery 11, and an upper end of the battery duct 14 may be disposed below the top surface of the battery 11. Such a configuration enables the whole or a main portion of the battery duct 14 to overlap the battery 11 in a direction in which side collision occurs. Thus, in a case where side collision occurs, it is possible to effectively mitigate impact to the battery 11 via deformation of the battery duct 14 pressed by the side sill 17, making it possible to favorably protect the battery 11 from the impact.

The air-conditioning duct 15 (the first air-conditioning duct branch 152) may at least partially be disposed below the top surface of the battery 11. Such a configuration enables the air-conditioning duct 15 to at least partially overlap the battery 11 in the direction in which side collision occurs. Thus, in a case where side collision occurs, it is possible to effectively mitigate impact to the battery 11 via deformation of the air-conditioning duct 15 pressed by the side sill 17. This makes it possible to favorably protect the battery 11 from the impact. The air-conditioning duct 15 (the first air-conditioning duct branch 152) may be disposed below the top surface of the battery 11, over the whole height of the air-conditioning duct 15.

Figure 3:
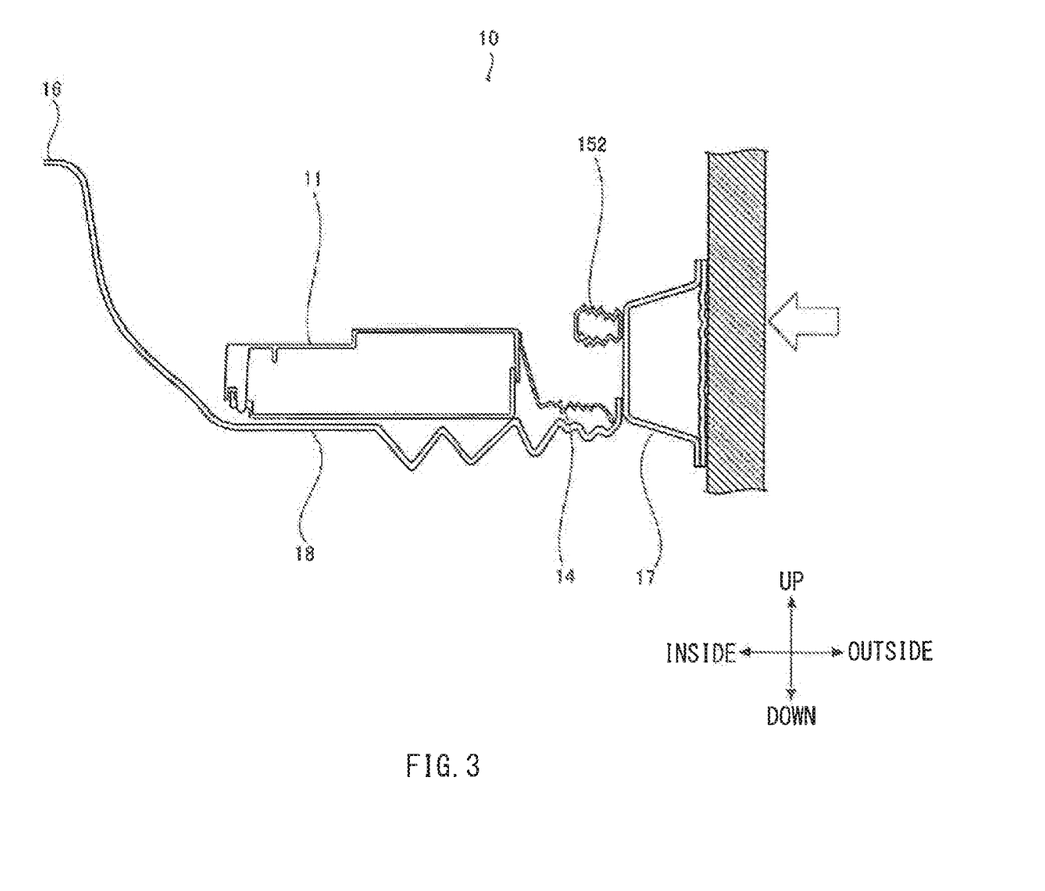
FIG. 3 is a schematic cross-sectional view of a state of the battery protection structure according to the example embodiment after occurrence of a collision ace ident.

FIG. 3 schematically illustrates a state of the batter protection structure 10 according to the example embodiment after side collision. With reference to FIG. 3, description will be given on a case where pole collision occurs at a portion, on a side surface of a body of the vehicle, indicated by line A-A in FIG. 1. Pole collision may refer to collision of a pole from the outside in the vehicle width direction. Upon pole collision, the pole may press the side sill 17 toward the inside of the vehicle. This causes the side sill 17 to enter toward the inside of the vehicle and come into contact with the battery duct 14 and the air-conditioning duct 15 (the first air-conditioning duct branch 152). This compresses, in the vehicle width direction, and deforms the battery duct 14 and the air-conditioning duct 15.

As illustrated in FIG. 1, a front portion of the first air-conditioning duct branch 152 may pass through the first through hole 131 of the cross-member 121, to be supported in the vehicle width direction by the inner surface of the first through hole 131. This reduces movement of the first air-conditioning duct branch 152 toward the inside of the vehicle. Therefore, even if the air-conditioning duct 15 is pressed to the inside of the vehicle by the side sill 17 upon side collision, it is possible for the first air-conditioning duct branch 152 to undergo crush deformation to absorb impact, while keeping its position in the front portion. In the example embodiment, the first air-conditioning duct branch 152 may have the bend diverted around the battery duct 14. This makes it possible to increase rigidity of the first air-conditioning duct branch 152 in the vehicle width direction, and keep the position of the first air-conditioning duct branch 152 as a whole against impact applied upon side collision.

In the example embodiment, an end of the battery duct 14 disposed at the location oriented toward the inside of the vehicle may be in contact with the battery 11 (e.g., a side surface of the battery 11). Therefore, in a case where side collision occurs, the battery duct 14 may be pressed from the outside of the vehicle by the side sill 17 at one end, and supported by the battery 11 at the other end, thereby undergoing crush deformation between the battery 11 and the side sill 17. This makes it possible to favorably absorb impact due to the side collision.

Figure 4:
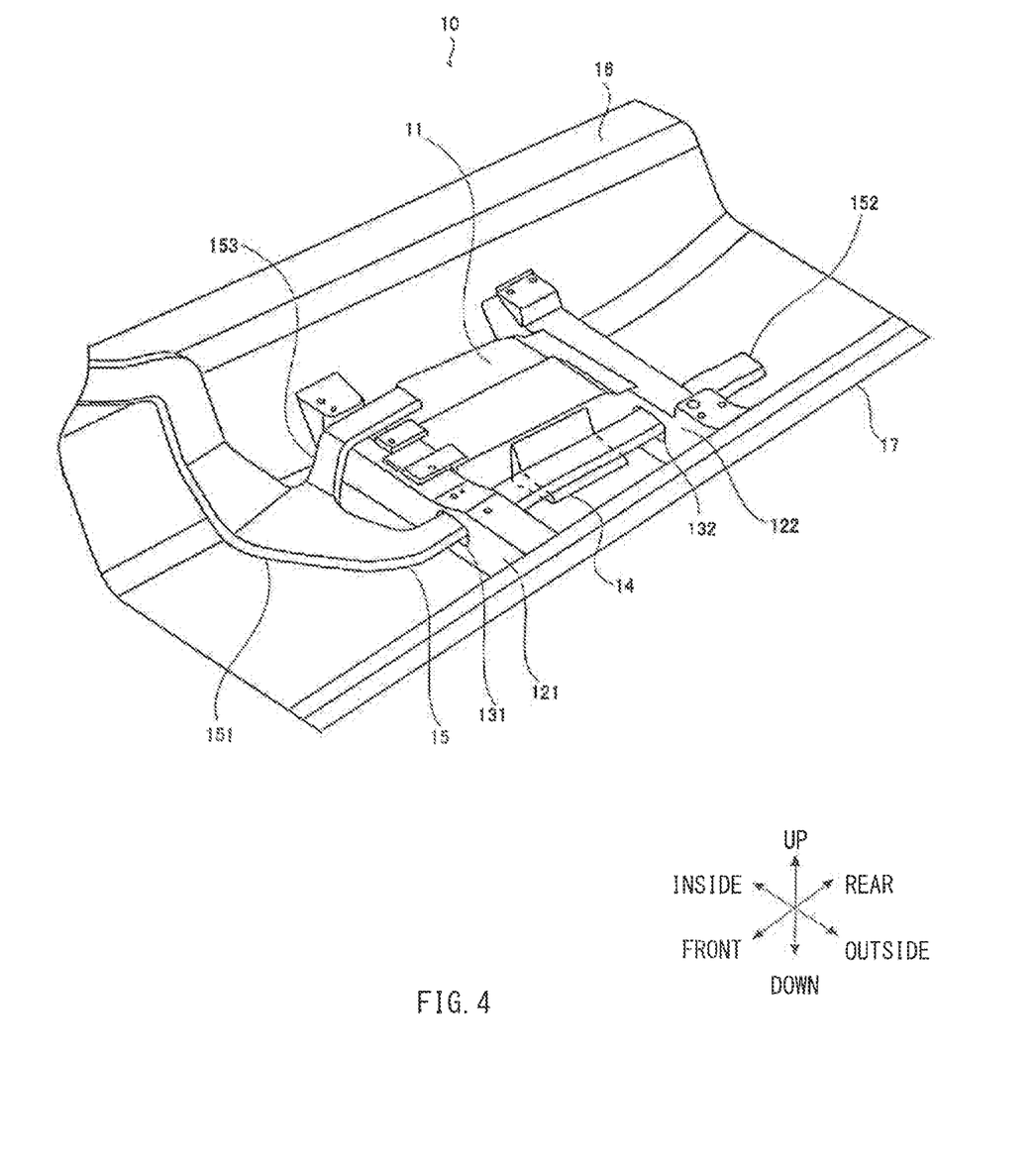
FIG. 4 is a perspective view of an overall configuration of a vehicle battery protection structure according to one example embodiment of the technology.

Furthermore, the battery duct 14 and the air-conditioning duct 15 (the first air-conditioning duct branch 52) overlap each other in the vertical direction, i.e., a direction perpendicular to the direction in which side collision occurs. This enables, in a case where side collision occurs, the battery duct 14 and the air-conditioning duct 15 to undergo crush deformation at the same time, making it possible to effectively absorb impact, thereby mitigating impact to the battery 11, FIG. 4 is a perspective view of an overall configuration of the vehicle battery protection structure 10 according to another example embodiment of the technology. The battery protection structure 10 according to the example embodiment may have a configuration basically similar to that in the foregoing example embodiment illustrated in FIG. 1. The main difference may be that the air-conditioning duct 15 (the first air-conditioning duct branch 152) penetrates not only the cross-member 121, but both the cross-member 121 and the cross-member 122.

In one example, the cross-member 121 disposed on the front side may have the first through hole 131 penetrating the cross-member 121 in the longitudinal direction of the vehicle. The cross-member 122 disposed on the rear side may have a second through hole 132 penetrating the cross-member 122 in the longitudinal direction of the vehicle. The front portion of the first air-conditioning duct branch 152 may be inserted through the first through hole 131 of the cross-member 121, and a rear portion of the first air-conditioning duct branch 152 may be inserted through the second through hole 132 of the cross-member 122.

Such a configuration enables the first air-conditioning duct branch 152 to pass through the first through hole 131 in the front portion to be supported by the cross-member 121, and pass through the second through hole 132 in the rear portion to be supported by the cross-member 122. Therefore, in a case where side collision occurs, it is possible to support the air-conditioning duct 15 more firmly against impact, enabling the air-conditioning duct 15 to more reliably protect the battery 11 from the side collision.

As described above, the example embodiment uses a simple configuration including the battery duct 14 and the air-conditioning duct 15 disposed on the outside of the battery 11 at the location oriented toward the outside of the vehicle. The simple configuration makes it possible to protect the battery 11 from impact applied when a collision accident such as side collision occurs. As described in JP-A No, 2009-035094, the battery mounting part supporting the battery from below may be used for protection. In this case, however, it is difficult to effectively protect the battery from impact due to lateral or rear collision. To protect the battery from side collision, a dedicated member for cushioning may be provided on the left or right side of the vehicle with respect to the battery. This, however, complicates a configuration of the vehicle, and also results in an increase in cost. In contrast, according to the example embodiment, a first duct and a second duct are provided as cushioning members. The second duct is disposed to be inserted through a through hole of a vehicle frame member, and to overlap the first duct in the vertical direction. This configuration makes it possible to fix the second duct relatively to a body of a vehicle to reduce movement of the second duct upon occurrence of a collision accident. This configuration also enables the second duct to absorb collision energy to protect a battery. Making the first duct and the second duct overlap each other in the vertical direction makes it possible to deform the first and second ducts at the same time upon collision, enabling both the first and second ducts to absorb collision energy. This makes it possible to absorb more collision energy, making it possible to effectively protect the battery.

Some example embodiments of the disclosure have been described above. The example embodiments of the disclosure are not limited to these example embodiments and may be modified within the scope of the technology. The example embodiments described above may be combined as appropriate.

For example, in the battery protection structure 10 illustrated in FIG. 1, the battery duct 14 and the air-conditioning duct 15 may be disposed on the left side in a direction of travel of the vehicle, which is the outside of the battery 11 oriented toward the outside of the vehicle. This makes it possible to protect the battery 11 from side collision from the left side, i.e., the outside of the battery 11 oriented toward the outside of the vehicle. Alternatively, the battery duct 14 and the air-conditioning duct 5 may be disposed on the right side in the direction of travel of the vehicle or on the rear side with respect to the battery 11. This makes it possible to protect the battery 11 from side collision from the right side or from rear collision from the rear side, which is the outside of the battery 11 oriented toward the outside of the vehicle.

The invention claimed is:

1. A vehicle battery protection structure comprising:
   a vehicle frame member disposed in a region including a battery, the vehicle frame member having a through hole, the battery being mountable on a vehicle;
   a first duct disposed on an outside of the battery at a location oriented toward an outside of the vehicle; and
   a second duct inserted through the through hole of the vehicle frame member, the second duct being disposed to overlap the first duct in a vertical direction of the first duct on the outside of the battery at the location oriented toward the outside of the vehicle.

2. The vehicle battery protection structure according to claim 1, wherein
   the first duct comprises a cooling duct for the battery, and
   the second duct comprises an air-conditioning duct for a cabin of the vehicle.

3. The vehicle battery protection structure according to claim 1, wherein the vehicle frame member comprises a cross-member to be provided between a floor tunnel and a side sill of a body of the vehicle.

4. The vehicle battery protection structure according to claim 3, wherein the first duct and the second duct are disposed closer to the battery in a vehicle width direction of the vehicle than the side sill is.

5. The vehicle battery protection structure according to claim 3, wherein
   the first duct is coupled to the battery and configured to exhaust heat generated by the battery, and
   the first duct is disposed closer to the battery in a vehicle width direction of the vehicle than the side sill is.

6. The vehicle battery protection structure according to claim 1, wherein the vehicle frame member comprises:
   a first vehicle frame member disposed on one side of the battery and having the through hole; and
   a second vehicle frame member disposed on the other side of the battery.

7. The vehicle battery protection structure according to claim 2, wherein the vehicle frame member comprises:
   a first vehicle frame member disposed on one side of the battery and having the through hole; and
   a second vehicle frame member disposed on the other side of the battery.

8. The vehicle battery protection structure according to claim 1, wherein
   the vehicle frame member comprises: a first vehicle frame member disposed on one side of the battery; and a second vehicle frame member disposed on the other side of the battery,
   the through hole comprises: a first through hole provided on the first vehicle frame member; and a second through hole provided on the second vehicle frame member, and
   the second duct is inserted through the first through hole and the second through hole.

9. The vehicle battery protection structure according to claim 2, wherein
   the vehicle frame member comprises: a first vehicle frame member disposed on one side of the battery; and a second vehicle frame member disposed on the other side of the battery,
   the through hole comprises: a first through hole provided on the first vehicle frame member; and a second through hole provided on the second vehicle frame member, and
   the second duct is inserted through the first through hole and the second through hole.

10. The vehicle battery protection structure according to claim 6, wherein the first vehicle frame member and the second vehicle frame member comprise cross-members to be provided between a floor tunnel and a side sill of a body of the vehicle.

11. The vehicle battery protection structure according to claim 8, wherein the first vehicle frame member and the second vehicle frame member comprise cross-members to be provided between a floor tunnel and a side sill of a body of the vehicle.

12. The vehicle battery protection structure according to claim 1, wherein the battery is disposed below a seat supportable by the vehicle frame member.

13. The vehicle battery protection structure according to claim 2, wherein the battery is disposed below a seat supportable by the vehicle frame member.

14. The vehicle battery protection structure according to claim 1, wherein the first duct has a lower end that is positioned above a bottom surface of the battery.

15. The vehicle battery protection structure according to claim 2, wherein the first duct has a lower end that is positioned above a bottom surface of the battery.

16. The vehicle battery protection structure according to claim 1, wherein the first duct has an upper end that is positioned below a top surface of the battery.

17. The vehicle battery protection structure according to claim 2, wherein the first duct has an upper end that is positioned below a top surface of the battery.

18. The vehicle battery protection structure according to claim 1, wherein the second duct has a lower end that is positioned below a top surface of the battery.

19. The vehicle battery protection structure according to claim 2, wherein the second duct has a lower end that is positioned below a top surface of the battery.

* * * * *